(12) United States Patent
Togan et al.

(10) Patent No.: US 9,696,990 B2
(45) Date of Patent: Jul. 4, 2017

(54) METHOD AND APPARATUS FOR IMPLEMENTING INTER-COMPONENT FUNCTION CALLS

(71) Applicants: Valeriu Togan, Crevenicu (RO); Marius Constantin Rotaru, Bucharest (RO)

(72) Inventors: Valeriu Togan, Crevenicu (RO); Marius Constantin Rotaru, Bucharest (RO)

(73) Assignee: NXP USA, Inc., Austin, TX (US)

( * ) Notice: Subject to any disclaimer, the term of this patent is extended or adjusted under 35 U.S.C. 154(b) by 213 days.

(21) Appl. No.: 14/551,285

(22) Filed: Nov. 24, 2014

(65) Prior Publication Data

US 2016/0085545 A1    Mar. 24, 2016

(30) Foreign Application Priority Data

Sep. 23, 2014    (RO) ..................... 14-00719

(51) Int. Cl.
*G06F 9/44*  (2006.01)
*G06F 9/445*  (2006.01)

(52) U.S. Cl.
CPC ............... *G06F 8/71* (2013.01); *G06F 8/65* (2013.01); *G06F 8/67* (2013.01); *G06F 9/4426* (2013.01)

(58) Field of Classification Search
CPC .......... G06F 9/443; G06F 9/4431; G06F 8/41; G06F 21/125; G06F 12/06; G06F 9/50
See application file for complete search history.

(56) References Cited

U.S. PATENT DOCUMENTS 5,442,793 A * 8/1995 Christian ............... G06F 9/443
                                                  712/E9.084
5,634,114 A * 5/1997 Shipley .................... G06F 8/71
                                                  717/170

(Continued)

FOREIGN PATENT DOCUMENTS

EP    0263447 A2    4/1988
WO    0049495 A2    8/2000

OTHER PUBLICATIONS

Xin Hu et al.; Large-Scale Malware Indexing Using Function-Call Graphs; 2009 ACM; pp. 611-620; <http://dl.acm.org/citation.cfm?id=1653736>.*

(Continued)

*Primary Examiner* — Thuy Dao
*Assistant Examiner* — Cuong V Luu

(57) ABSTRACT

A method of implementing inter-component function calls. The method comprises generating a lower tier indirection data structure comprising an entry indicating a location in memory of a function within a first software component, a higher tier indirection data structure comprising an entry indicating a location in memory of the lower tier indirection data structure, and a configuration data structure comprising an entry defining an active version of the first software component. The method further comprises implementing executable computer program code for an inter-component function call by referencing entries within the configuration data structure, the higher tier indirection data structure and the lower tier indirection data structure.

12 Claims, 7 Drawing Sheets

(56) References Cited

U.S. PATENT DOCUMENTS

| | | | |
|---|---|---|---|
| 6,163,880 A * | 12/2000 | Ramalingam | G06F 9/443 712/E9.084 |
| 8,438,315 B1 * | 5/2013 | Tao | G06F 9/4411 710/5 |
| 8,504,799 B2 | 8/2013 | Han | |
| 2004/0215754 A1 * | 10/2004 | Orleth | G06F 9/4411 709/223 |
| 2007/0038988 A1 * | 2/2007 | Das | G06F 9/4431 717/157 |
| 2010/0262816 A1 | 10/2010 | Klings et al. | |
| 2011/0107070 A1 | 5/2011 | Barbulescu et al. | |
| 2013/0014092 A1 * | 1/2013 | Hiniker | G06F 8/41 717/140 |
| 2014/0101648 A1 * | 4/2014 | Teh | G06F 8/65 717/170 |

OTHER PUBLICATIONS

Brad Calder et al.; Reducing Indirect Function Call Overhead in C++ Programs ; 1994 ACM; pp. 397-408; <http://dl.acm.org/citation.cfm?id=177973>.*

Aubrey-Derrick Schmidt et al.; Detecting Symbian OS Malware through Static Function Call Analysis; 2009 IEEE; pp. 15-22; <http://ieeexplore.ieee.org/stamp/stamp.jsp?arnumber=5403024>.*

Yu Feng et al.; Apposcopy Semantics-Based Detection of Android Malware through Static Analysis; 2014 ACM; pp. 576-587; <http://dl.acm.org/citation.cfm?id=2635869&CFID=741657135&CFTOKEN=75078925>.*

Philippe Moret et al.; Tool Demonstration Effective Runtime Exploration of the Inter-Procedural Control Flow in Java Applications; 2010 ACM; pp. 162-165; <http://dl.acm.org/citation.cfm?id=1852785&CFID=741657135&CFTOKEN=75078925>.*

Todd Mytkowicz et al.; Inferred Call Path Profiling ; 2009 ACM; pp. 175-189; <http://dl.acm.org/citation.cfm?id=1640102&CFID=741657135&CFTOKEN=75078925>.*

Autosar, "Specification of ECU Configuration," V3.2.0, R4.0, Rev 3; Chapter 2.3.2.3 (p. 24); downloaded from <<http://www.autosar.org/fileadmin/files/releases/4-0/methodology-templates/templates/standard/AUTOSAR_TPS_ECUConfiguration.pdf>> on Nov. 19, 2014, 1 page.

Wikipedia, "Dynamic Dispatch," downloaded from <<http://en.wikipedia.org/wiki/Dynamic_dispatch>> on Nov. 18, 2014; 4 pages.

Wikipedia, "Multiple Dispatch," downloaded from <<http://en.wikipedia.org/wiki/Multiple_dispatch>> on Nov. 18, 2014; 10 pages.

Wikipedia, "Branch Table," downloaded from <<http://en.wikipedia.org/wiki/Branch_table>> on Nov. 18, 2014; 7 pages.

Wikipedia, "Virtual Method Table," downloaded from <<http://en.wikipedia.org/wik/Virtual_method_table>> on Nov. 18, 2014; 6 pages.

* cited by examiner

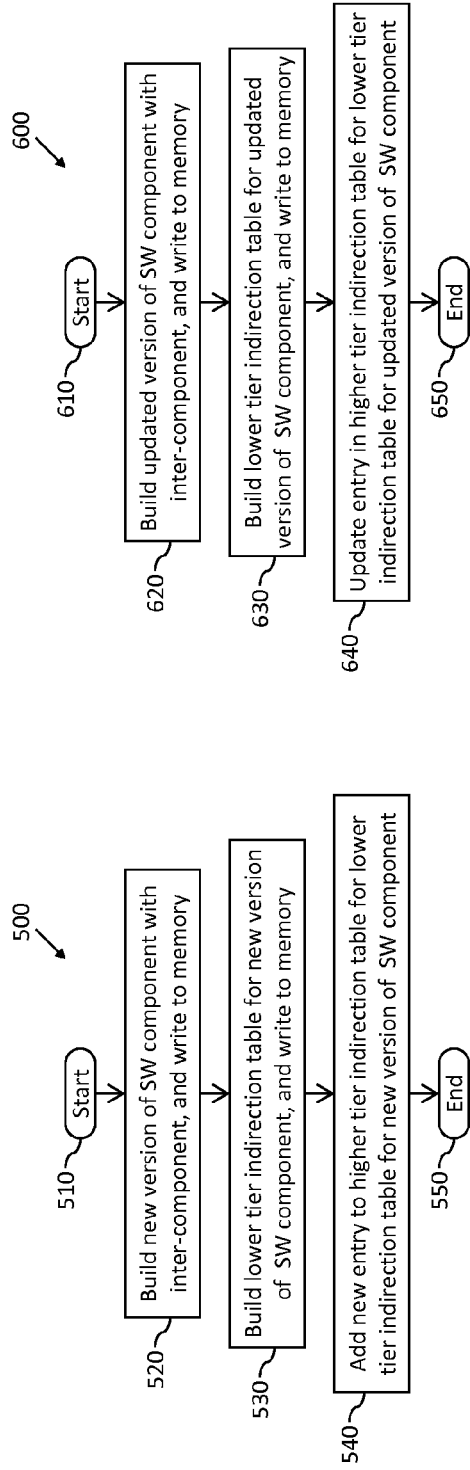
FIG. 5
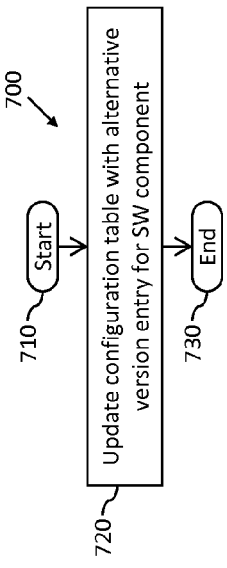
FIG. 6
FIG. 7

METHOD AND APPARATUS FOR IMPLEMENTING INTER-COMPONENT FUNCTION CALLS

CROSS REFERENCE TO RELATED APPLICATION(S)

The present application claims priority to Romanian Patent Application No. RO A 2014 00719, entitled "METHOD AND APPARATUS FOR IMPLEMENTING INTER-COMPONENT FUNCTION CALLS," filed on Sep. 23, 2014, the entirety of which is herein incorporated by reference.

FIELD OF THE INVENTION

This invention relates to a method and apparatus for implementing inter-component function calls within executable program code.

BACKGROUND OF THE INVENTION

Complex applications for embedded devices typically consist of multiple dependent software components. Each software component consists of one or multiple APIs (Application Programming Interfaces) which implement a specific functionality (or set of functionalities) of the application. The dependency between software components of an application means that some components need to call APIs from other components in order to implement their functionalities. Conventionally, when direct calls are made from one software component to an API from another software component, the address of the called API is hardcoded within the caller component during the compile/link process. This prevents switching between different code versions of a software component containing a called API because the start address of the called API will typically be different for each version.

In order to correct a defect or to improve a functionality of the application, it may only be necessary to update one of the software components. However, due to direct API calls made between the software components, any simple post-build update to a specific component requires a rebuild of the entire application in order to ensure hardcoded addresses of called APIs are also updated. Often the activities needed to rebuild and deploy the entire application are very complex, even though the needed updates are simple. There are also instances when the source code or object code for some components of the application may no longer be available, preventing a general rebuild.

In addition to the above, it is often desirable to be able to select which implementation of a polymorphic operation (method or function) to call at runtime, for example in order to change the behaviour of an application at run-time with no-downtime. C++ compilers typically implement dynamic dispatch with a data structure called a virtual table that defines the message to method mapping for a given class. Instances of that type will then store a pointer to this table as part of their instance data. However, because C++ does not support late binding, the virtual table in a C++ object cannot be modified at run-time or post build time, which limits the potential set of dispatch targets to a finite set chosen at compile-time.

SUMMARY OF THE INVENTION

The present invention provides a method of implementing inter-component function calls within a computer program, a non-transitory computer program product having executable program code stored therein for implementing inter-component function calls within a computer program, an apparatus for generating executable computer program code comprising at least one processing module arranged to implement inter-component function calls within computer programs, an non-transitory computer program product having executable computer program code stored therein, and a device comprising at least one processing module arranged to execute computer program code as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 5 illustrates a simplified flowchart of an example of a method of loading a new software component post-build within executable computer program code.

FIG. 6 illustrates a simplified flowchart of an example of a method of updating a software component post-build within executable computer program code.

FIG. 7 illustrates a simplified flowchart of an example of a method of switching between different versions of a software component post-build within executable computer program code.

DETAILED DESCRIPTION OF THE PREFERRED EMBODIMENTS

The present invention will now be described with reference to the accompanying drawings. However, it will be appreciated that the present invention is not limited to the specific embodiments herein described and as illustrated in the accompanying drawings. Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
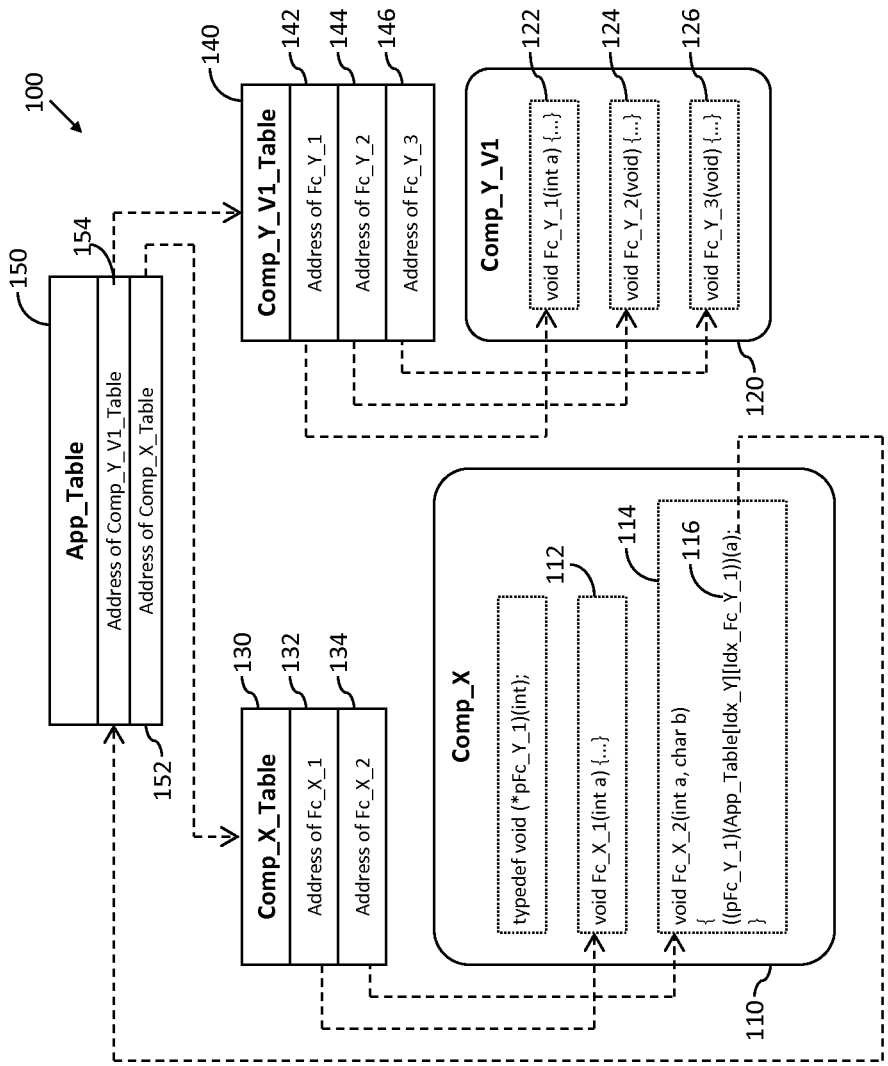
FIG. 1 illustrates a simplified block diagram of an example architecture for a part of an executable computer program.

Referring now to FIG. 1, there is illustrated a simplified block diagram of an example architecture for a part of an executable computer program 100, such as application program code for execution within, say, an embedded system. In the illustrated example, the executable computer program architecture 100 comprises a first software component Comp_X 110 comprising a first function Fc_X_1 112 and a second function Fc_X_2 114. The executable computer program code architecture 100 further comprises a second software component Comp_Y_V1 120 comprising a first function Fc_Y_1 122, a second function Fc_Y_2 124 and a third function Fc_Y_3 126. In the illustrated example, the various functions 112, 114, 122, 124, 126 are intended to be accessible outside of their respective software components 110, 120 (e.g. comprising 'public' functions). Furthermore, the second function Fc_X_2 114 within the first software component 110 comprises an inter-component function call 116 to the first function Fc_ Y_ 1 122 within the second software component 120.

For clarity, the term 'function' used herein is intended to refer to a sequence of computer program instructions that perform a particular task arranged as a callable unit. Such callable units of computer program instructions are also known by various other terms such as routines, subroutines, procedures, methods, subprograms, etc. Accordingly, it will be understood that the term function used herein should be interpreted as encompassing such alternatively named callable units of computer program code In the illustrated example, the executable computer program architecture 100 further comprises a first lower tier indirection data structure (Comp_X_Table) 130 associated with (at least) the first software component 110 and a second lower tier indirection data structure (Comp_Y_V1_Table) 140 associated with (at least) the second software component 120. In the illustrated example, the lower tier indirection data structures 130, 140 comprise tables containing entries for functions within software components with which they are associated. In some examples, the lower tier indirection data structures 130, 140 may comprise entries for all functions accessible outside of their respective software components. Accordingly, in the illustrated example the first lower tier indirection data structure 130 comprises entries 132, 134 for the first function Fc_X_1 112 and second function Fc_X_2 114 respectively within the first software component 110, whilst the second lower tier indirection data structure 140 comprises entries 142, 144, 146 for the first function Fc_Y_1 122, second function Fc_Y_2 124 and third function Fc_Y_3 126 respectively within the second software component 120. The entries 132, 134, 142, 144, 146 within the lower tier indirection data structures 130, 140 may comprise, for example, addresses within memory for their respective functions, address offset values, or any other suitable parameters that enable the location of the respective functions within memory to be determined during program execution.

The executable computer program architecture 100 further comprises at least one higher tier indirection data structure, such as the higher tier indirection data structure (App_Table) 150 illustrated in FIG. 1. In the illustrated example, the higher tier indirection data structure(s) 150 comprises a table containing entries for the lower tier indirection data structures within the computer program architecture 100. Accordingly, in the illustrated example the higher tier indirection data structure 150 comprises entries 152, 154 for the first and second lower tier indirection data structures 130, 140 respectively. The entries 152, 154 within the (or each) higher tier indirection data structure 150 may comprise, for example, addresses within memory for the respective lower tier indirection data structures 130, 140, address offset values, or any other suitable parameters that enable the location of the lower tier indirection data structures 130, 140 within memory to be determined during program execution.

The architecture of the executable computer program 100 illustrated in FIG. 1 is such that, in order for an inter-component function call within one software component to be able to call a function within a different software component, the inter-component function call needs to know the following information in order to make such a call:
  (i) an address in memory of the higher tier indirection data structure 150;
  (ii) an index to the entry 152, 154 within the higher tier indirection data structure 150 identifying the address in memory of the lower tier indirection data structure 130, 140 associated with the software component 110, 120 comprising the function to be called; and
  (iii) an index to the entry 132, 134, 142, 144, 146 within the lower tier indirection data structure 130, 140 identifying the address in memory of the function to be called.

Accordingly, in the illustrated example, the inter-component function call 116 within the second function Fc_X_2 114 of the first software component 110 comprises:
  a location reference (App_Table) to the higher tier indirection data structure 150;
  a first index reference (Idx_Y) to an entry within the higher tier indirection data structure 150; and
  a second index reference (Idx_Fc_Y_1) to an entry within the second lower tier indirection data structure 140.

The location reference to the higher tier indirection data structure 150 may comprise the actual address or other indication of the location within memory where the higher tier indirection data structure 150 is located. The first index reference (Idx_Y) may comprise, say, an integer pointer or the like that identifies, in the illustrated example, the entry 154 within the higher tier indirection data structure 150 for the second lower tier indirection data structure 140. Similarly, the second index reference (Idx_Fc_Y_1) may comprise an integer pointer or the like that identifies, in the illustrated example, the entry 142 for the first function Fc_Y_1 122 within the second software component 120.

In this manner, when the inter-component function call 116 is executed, the location reference (App_Table) enables the location of the higher tier indirection data structure 150 within memory to be determined, and the entry 154 identified by the first index reference (Idx_Y) read to enable the location of the second lower tier indirection data structure 140 within memory to be determined. The entry 142 within the lower tier indirection data structure 140 identified by the second index reference (Idx_Fc_Y_1) may then be read to enable the location in memory of the inter-component function Fc_Y_1 122 within the second software component 120 to be determined, thereby enabling the computer program code of the function Fc_Y_1 122 to be fetched from memory and executed.

Advantageously, the use of the indirection data structures 130, 140, 150 avoids the need for direct API calls to be made between software components, thereby removing the direct dependency between software components linked by inter-component function calls. The use of a first (lower) tier of indirection data structures allows the locations in memory of functions to be exported and made available to other software components that call those functions, in a similar manner to virtual tables used by conventional C++ compilers to implement dynamic dispatch. However, unlike dynamic dispatch implemented by conventional C++ compilers, in the example illustrated in FIG. 1, a second (higher) tier of indirection data structure(s) is provided. This second (higher) tier of indirection data structure(s) provides an additional level of independence between the software components, and in particular removes a dependency between an inter-component function call and the indirection data structure for the component comprising the function being called. In this manner, and as described in greater detail below, inter-component function calls are not restricted to finite sets of dispatch targets chosen at compile-time, since the provision of the higher tier indirection data structure(s) enables function calls to be directed to different/updated/new lower tier indirection data structures. This two-tier indirection data structure architecture significantly increases the flexibility when updating software components post-build and during runtime, enabling the behaviour of an application to be changed at run-time with no-downtime.

For example, when the second software component 120 illustrated in FIG. 1 is required to be updated or otherwise changed, the relative positions (i.e. address offsets) of the various functions 122, 124, 126 within an updated version of the second software component 120 may be different compared to the previous (current) version. The provision of the lower tier indirection structure 140 associated with the second software component 120 allows the new version of the second software component 120 to be loaded into memory, and the entries 142, 144, 146 within the lower tier indirection structure 140 to be updated to point to the new locations in memory of the respective functions 122, 124, 126 within the new version of the second software component 120. Significantly, no changes or updates are required to be made to the function call 116 within the first software component 110 to the first function 122 within the second software component 120. Thus, a simple post-build update to the second software component 120 does not require a complete rebuild of the entire computer program application.

Figure 2:
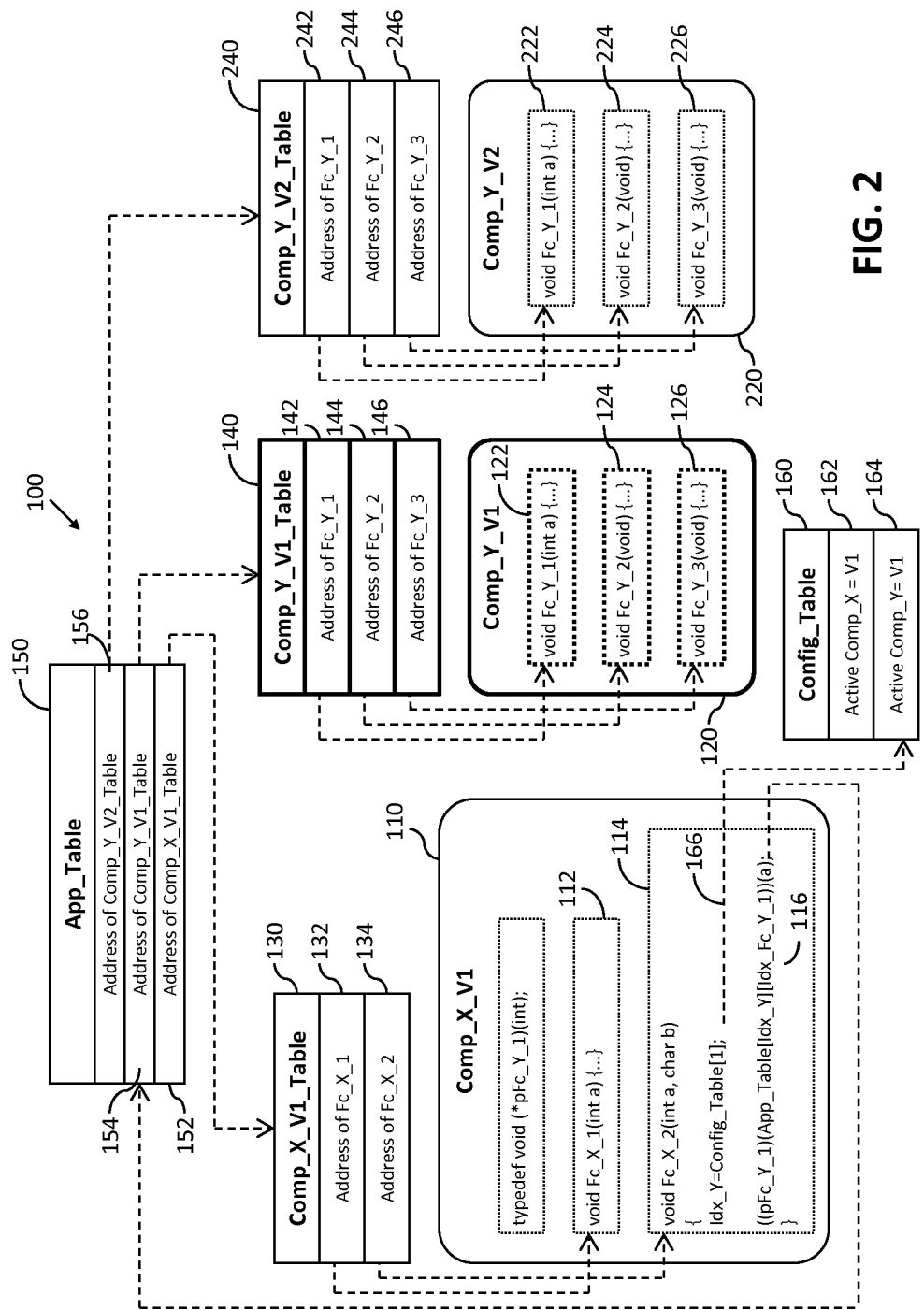
FIGS. 2 and 3 illustrate simplified block diagrams of a further alternative example architecture for a part of an executable computer program.

FIG. 2 illustrates a simplified block diagram of an alternative example of the architecture for the part of the executable computer program 100 whereby multiple versions of a software component may be loaded into memory and switched between post-build, for example at runtime. In the example illustrated in FIG. 2, two versions of the second software component are illustrated: a first version 120 and a second version 220. In the illustrated example, a separate lower tier indirection data structure 140, 240 is provided for each version of the second software component 120, 220, with each of these lower tier data structures 140, 240 comprising tables containing entries for the functions 122, 124, 126, 222, 224, 226 within the respective versions of the second software component 120, 220.

In the example illustrated in FIG. 2, the higher tier indirection data structure 150 comprises entries 152, 154, 156 for the first, second and third lower tier indirection data structures 130, 140, 240 respectively. Notably, in the example illustrated in FIG. 2, the higher tier indirection data structure 150 comprises a separate entry for each version 140, 240 of the second software component. The entries 152, 154, 156 within the (or each) higher tier indirection data structure 150 may comprise, for example, addresses within memory for the respective lower tier indirection data structures 130, 140, 240, address offset values, or any other suitable parameters that enable the location of the lower tier indirection data structures 130, 140, 240 within memory to be determined during program execution.

It is contemplated that the second version 220 of the second software component may be loaded into memory at substantially any time post-build. For example, the second version 220 of the second software component may comprise an updated version of the second software component loaded post-build. Alternatively, the first and second versions 120, 220 of the second software component may be intended alternative versions of the second software component selectable during runtime depending on, say, user requirements, etc.

In the example illustrated in FIG. 2, the executable computer program architecture 100 further comprises a configuration data structure (Config_Table) 160, which in the illustrated example comprises a configuration table containing entries defining active versions of software components within the executable computer program. Thus, in the simplified illustrated example, the configuration data structure 160 comprises a first entry 162 defining an active version of the first software component 110 and a second entry 164 defining an active version of the second software component 120, 220. Each entry 162, 164 within the configuration data structure 160 may comprise, say, an integer value or the like that identifies an active version of the respective software component. In the illustrated example, the configuration data structure 160 contains a single entry 162 164 for each software component, no matter how many versions of a particular software component are present in memory. In the example illustrated in FIG. 2, the second entry 164 within the configuration data structure 160 is configured to define the first version 120 of the second software component as the active version.

The architecture of the executable computer program 100 illustrated in FIG. 2 is such that, in order for an inter-component function call within one software component to be able to call a function within a different software component, the inter-component function call needs to know the following information in order to make such a call:

(iv) an address in memory of the higher tier indirection data structure 150;

(v) an address in memory of the configuration data structure 160;

(vi) an index to the entry 162, 164 within the configuration data structure 160 defining the active version of the software component comprising the function to be called, and from which an index to the entry 152, 154, 156 within the higher tier indirection data structure 150 identifying the address in memory of the lower tier indirection data structure 130, 140 associated with the active version of the software component 110, 120 may be derived; and (vii) an index to the entry 132, 134, 142, 144, 146 within the lower tier indirection data structure 130, 140 identifying the address in memory of the function to be called.

Accordingly, in the illustrated example, the inter-component function call 116 within the second function Fc_X_2 114 of the first software component 110 comprises:

a location reference (App_Table) to the higher tier indirection data structure 150;

a first index reference (Idx_Y) obtained from the configuration data structure 160 to an entry within the higher tier indirection data structure 150; and a second index reference (Idx_Fc_Y_1) to an entry within a lower tier indirection data structure for the second software component.

The location reference to the higher tier indirection data structure 150 may comprise the actual address or other indication of the location within memory where the higher tier indirection data structure 150 is located. The first index reference (Idx_Y) may comprise, say, an integer pointer or the like that identifies, in the illustrated example, the entry within the higher tier indirection data structure 150 for the required second lower tier indirection data structure. This first index reference (Idx_Y) is loaded from the configuration data structure 160, at 166, to identify which version of the second software component is active, and thus which entry within the higher tier indirection data structure 150 is to be indexed. Thus, in the example illustrated in FIG. 2 the index reference (Idx_Y) loaded from the configuration data structure 160 indexes the entry 154 within the higher tier indirection data structure 150 for the lower tier indirection data structure 140 associated with the first version 120 of the second software component. The second index reference (Idx_Fc_Y_1) may also comprise an integer pointer or the like that identifies, in the illustrated example, the entry 142 for the first function Fc_Y_1 122 within the second software component 120.

In this manner, when the inter-component function call 116 is executed, the location reference (App_Table) enables the location of the higher tier indirection data structure 150 within memory to be determined, and the entry 154 identified by the first index reference (Idx_Y), loaded at 166, to be read to enable the location of the second lower tier indirection data structure 140 within memory to be determined. The entry 142 within the lower tier indirection data structure 140 identified by the second index reference (Idx_Fc_Y_1) may then be read to enable the location in memory of the inter-component function Fc_Y_1 122 within the first (active) version 120 of the second software component to be determined, thereby enabling the computer program code of the function Fc_Y_1 122 to be fetched from memory and executed.

Figure 3:
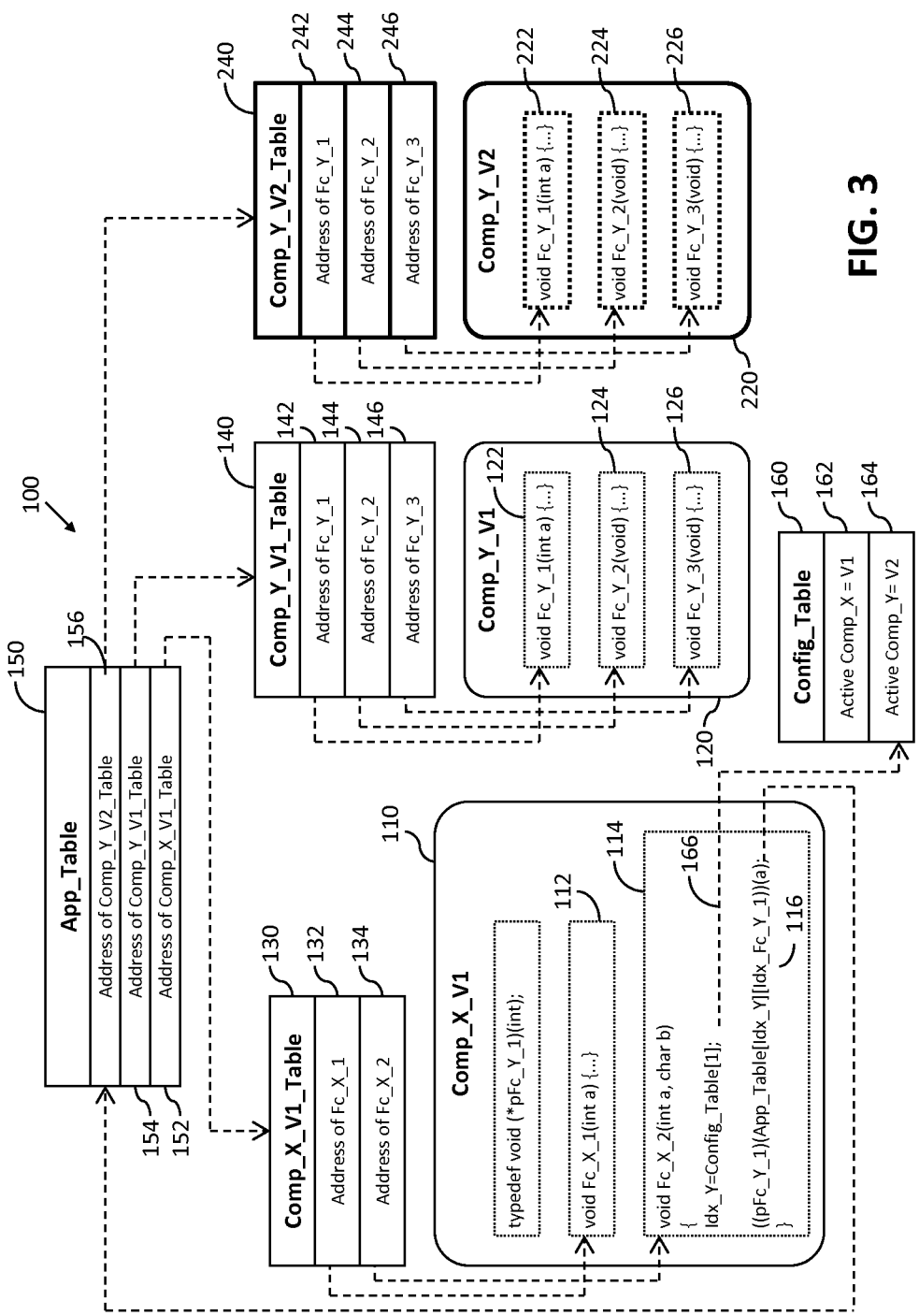

Advantageously, the use of the configuration data structure 160 and the provision of separate entries 154, 156 within the higher tier indirection table and the separate lower tier indirection data structures 140, 240 for the different versions of the second software component facilitates switching between different versions at run-time by simply updating the relevant entry 164 within the configuration data structure 160, for example depending on customer requirements, environmental conditions, or any other factors and/or considerations. For example, and as illustrated in FIG. 3, the second entry 164 within the configuration data structure 160 has been (re)configured to define the second version 220 of the second software component as the active version. Accordingly, in the example illustrated in FIG. 3 the index reference (Idx_Y) loaded from the configuration data structure 160 indexes the entry 156 within the higher tier indirection data structure 150 for the lower tier indirection data structure 240 associated within the second version 220 of the second software component 120. The second index reference (Idx_Fc_Y_1) may also comprise an integer pointer or the like that identifies, in the illustrated example, the entry 242 for the first function Fc_Y_1 222 within the second software component 220.

In this manner, when the inter-component function call 116 is executed, the location reference (App_Table) enables the location of the higher tier indirection data structure 150 within memory to be determined, and the entry 156 identified by the first index reference (Idx_Y), loaded at 166, to be read to enable the location of the third lower tier indirection data structure 240 within memory to be determined. The entry 242 within the lower tier indirection data structure 240 identified by the second index reference (Idx_Fc_Y_1) may then be read to enable the location in memory of the inter-component function Fc_Y_1 222 within the second (active) version 220 of the second software component to be determined, thereby enabling the computer program code of the function Fc_Y_1 222 to be fetched from memory and executed.

In addition to facilitating switching between different versions of a software component at run-time, the use of the configuration data structure 160 and the provision of separate entries 154, 156 within the higher tier indirection data structure 150 and the separate lower tier indirection data structures 140, 240 for the different versions of the second software component further facilitates the live updating of software components and specific versions of software components at run-time. For example, an updated/new version of a software component may be loaded into memory along with a corresponding lower tier indirection data structure while another version of the same software component is running. The corresponding entry within the higher tier indirection data structure 150 may then be updated to indicate the location in memory of the lower tier indirection data structure for the updated software component version. Subsequently, when the application is to switch to the updated version of the software component, the corresponding entry within the configuration data structure 160 simply needs to be updated to indicate the updated version of the software component as being the active version, thereby providing an index reference to the corresponding entry within the higher tier indirection data structure 150.

Figure 4:
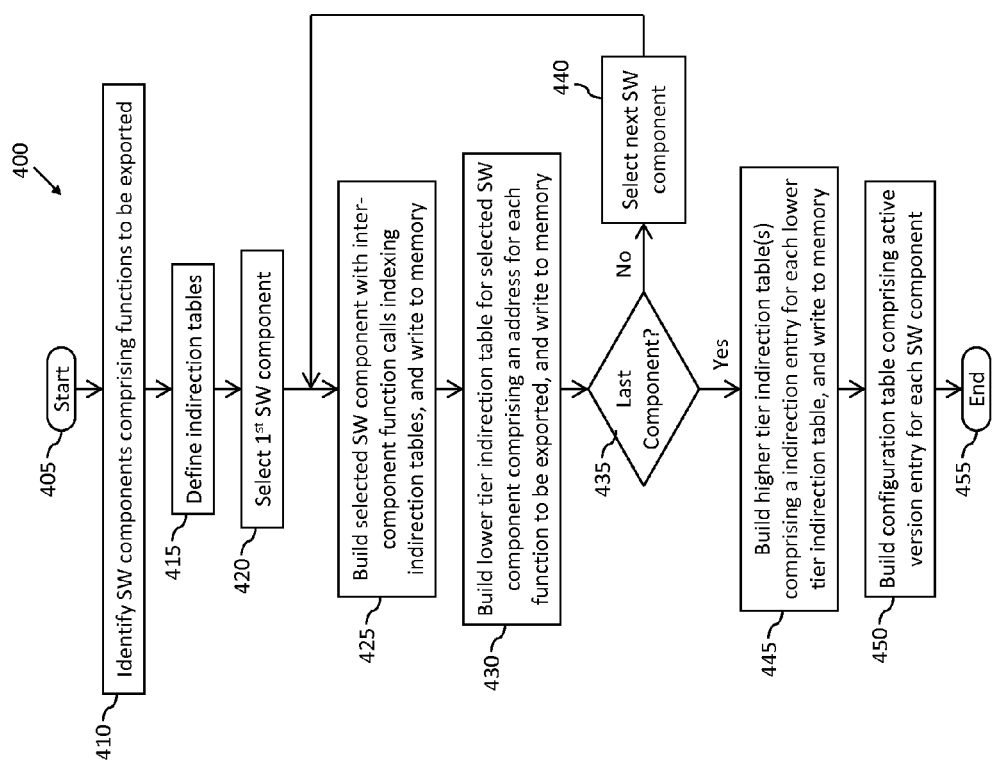
FIG. 4 illustrates a simplified flowchart of an example of a method of implementing inter-component function calls within executable computer program code.

Referring now to FIG. 4, there is illustrated a simplified flowchart 400 of an example of a method of implementing inter-component function calls within executable computer program code, such as the executable computer program 100 illustrated in FIGS. 2 and 3. In summary, the method comprises generating at least a first lower tier indirection data structure associated with (at least) a first software component, the first lower tier indirection data structure comprising at least one entry indicating a location in memory of at least one function within the first software component, generating at least one higher tier indirection data structure comprising an entry indicating a location in memory of the first lower tier indirection data structure, and generating at least one configuration data structure comprising at least one entry defining an active version of the at least first software component. The method further comprises implementing executable computer program code for at least one inter-component function call to the function within the first software component from within at least one further software component to:

load a version index reference comprising an indication of an active version of the at least first software component comprising the function to be called from an entry within the configuration data structure;

reference an entry within the higher tier indirection data structure to determine the location in memory of the first lower tier indirection data structure based on the loaded version index reference; and reference an entry in the first lower tier indirection data structure to determine the location in memory of the function within the first software component.

Referring now to the flowchart illustrated in FIG. 4, in the illustrated example, the method starts at 405 and moves on to 410 where software components comprising functions to be accessible outside of the respective software components are identified. In the illustrated example, indirection data structures to be generated are defined based at least partly on the identified software components, at 415. In particular for the example illustrated in FIG. 4, lower tier indirection data structures are defined for each version of each software component intended to be loaded into memory at run-time. Furthermore, a higher tier indirection data structure may be defined comprising an entry for each defined lower tier indirection data structure. A configuration data structure such as the configuration data structure 160 of FIGS. 2 and 3 may also be defined at 415.

A first software component (specifically in the example illustrated in FIG. 4 a particular version of a particular component in the case of a software component for which there are multiple versions) is selected at 420, before the method moves on to 425 where executable program code for the selected software component is generated and written to memory, with inter-component function calls within the selected software component being implemented by way of executable computer program code arranged to:

load a version index reference comprising an indication of an active version of the software component comprising the function to be called from an entry within the configuration data structure;

reference an entry within the higher tier indirection data structure to determine the location in memory of a lower tier indirection data structure based on the loaded version index reference; and reference an entry in said lower tier indirection data structure indicating the location in memory of the function within the respective (active) version of the software component.

Next, at 430, a lower tier indirection data structure is generated for the selected software component, the lower tier indirection data structure comprising an entry for each function within the selected software component that is to be accessible outside of the selected software component, each entry indicating the location in memory of the executable code for the respective function.

The method then moves on to 435, where it is determined whether executable code for all of the software components has been generated and written to memory (including alternative versions of software components). If it is determined that executable code for at least one version of at least one software component is still be generated and written to memory, the method moves on to 440 where the next software component (or version thereof) is selected, and the method loops back to 425. However, if it is determined that executable code for all versions of all of the software components has been generated and written to memory, at 435, the method in the illustrated example moves on to 445 where a higher tier indirection data structure is generated comprising an entry for each lower tier indirection data structure, each entry indicating the location in memory of the respective lower tier indirection data structure. In the example illustrated in FIG. 4, a configuration data structure, such as the configuration data structure 160 illustrated in FIGS. 2 and 3, is generated, at 450, comprising at least one entry defining active versions of software components already loaded into memory, and in particular of the software components comprising multiple versions thereof.

The method then ends, at 455.

Referring now to FIG. 5, there is illustrated a simplified flowchart 500 of an example of a method of loading a new software component post-build within executable computer program code, such as one of the software components 110, 120, 220 within the executable computer program 100 illustrated in FIGS. 2 and 3. The method starts at 510, and moves on to 520 where executable program code for a new version of the software component is generated and written to memory, with inter-component function calls within the software component being implemented by way of executable computer program code arranged to:

load a version index reference comprising an indication of an active version of the software component comprising the function to be called from an entry within the configuration data structure;

reference an entry within the higher tier indirection data structure to determine the location in memory of a lower tier indirection data structure based on the loaded version index reference; and reference an entry in said lower tier indirection data structure indicating the location in memory of the function within the respective (active) version of the software component.

Next, at 530, a lower tier indirection data structure associated with the new software component is generated comprising entries that indicate the locations in memory of the executable code for the respective functions within the new software component version, and written to memory. An entry is then added to the higher tier indirection data structure indicating the location in memory of the lower tier indirection data structure associated with the new software component, at 540. The method then ends at 550. Significantly, such a method requires no modification or rebuilding of other software components within the computer program, and enables a new version of a software component to be loaded at run-time within minimum (if any) down-time of the processing system executing the computer program code.

Referring now to FIG. 6, there is illustrated a simplified flowchart 600 of an example of a method of updating a software component post-build within executable computer program code, such as one of the software components 110, 120, 220 within the executable computer program 100 illustrated in FIGS. 2 and 3. The method starts at 610, and moves on to 620 where executable program code for an updated version of the software component is generated and written to memory, with inter-component function calls within the software component being implemented by way of executable computer program code arranged to:

load a version index reference comprising an indication of an active version of the software component comprising the function to be called from an entry within the configuration data structure;

reference an entry within the higher tier indirection data structure to determine the location in memory of a lower tier indirection data structure based on the loaded version index reference; and reference an entry in said lower tier indirection data structure indicating the location in memory of the function within the respective (active) version of the software component.

Next, at 630, a lower tier indirection data structure associated with the updated software component is generated comprising entries that indicate the locations in memory of the executable code for the respective functions within the updated software component version, and written to memory. The respective entry within the higher tier indirection data structure is updated to indicate the location in memory of the lower tier indirection data structure associated with the updated software component, at 640. The method then ends at 650. Significantly, such a method requires no modification or rebuilding of other software components within the computer program, and enables an updated version of a software component to be loaded at run-time within minimum (if any) down-time of the processing system executing the computer program code.

Referring now to FIG. 7, there is illustrated a simplified flowchart 700 of an example of a method of switching between different versions of a software component post-build within executable computer program code, such as between the two versions 120, 220 of the second software component within the executable computer program 100 illustrated in FIGS. 2 and 3. In this method, it is assumed that executable code for both versions of the software component, along with respective lower tier indirection data structures for the two versions of the software component, have already been loaded into memory and respective entries for the lower tier indirection data structures are present within the higher tier indirection data structure, and an entry in the configuration data structure defines, say, a first version of the software component as the active component. The method starts at 710, and moves on to 720 where the entry in the configuration data structure (e.g. entry 164 in the configuration data structure 160 illustrated in FIGS. 2 and 3) is updated to define the second version of the software component as the active version. The method then ends, at 730. Once again, such a method requires no modification or rebuilding of other software components within the computer program, and enables switching between multiple versions of a software component at run-time within no down-time of the processing system executing the computer program code.

Figure 8:
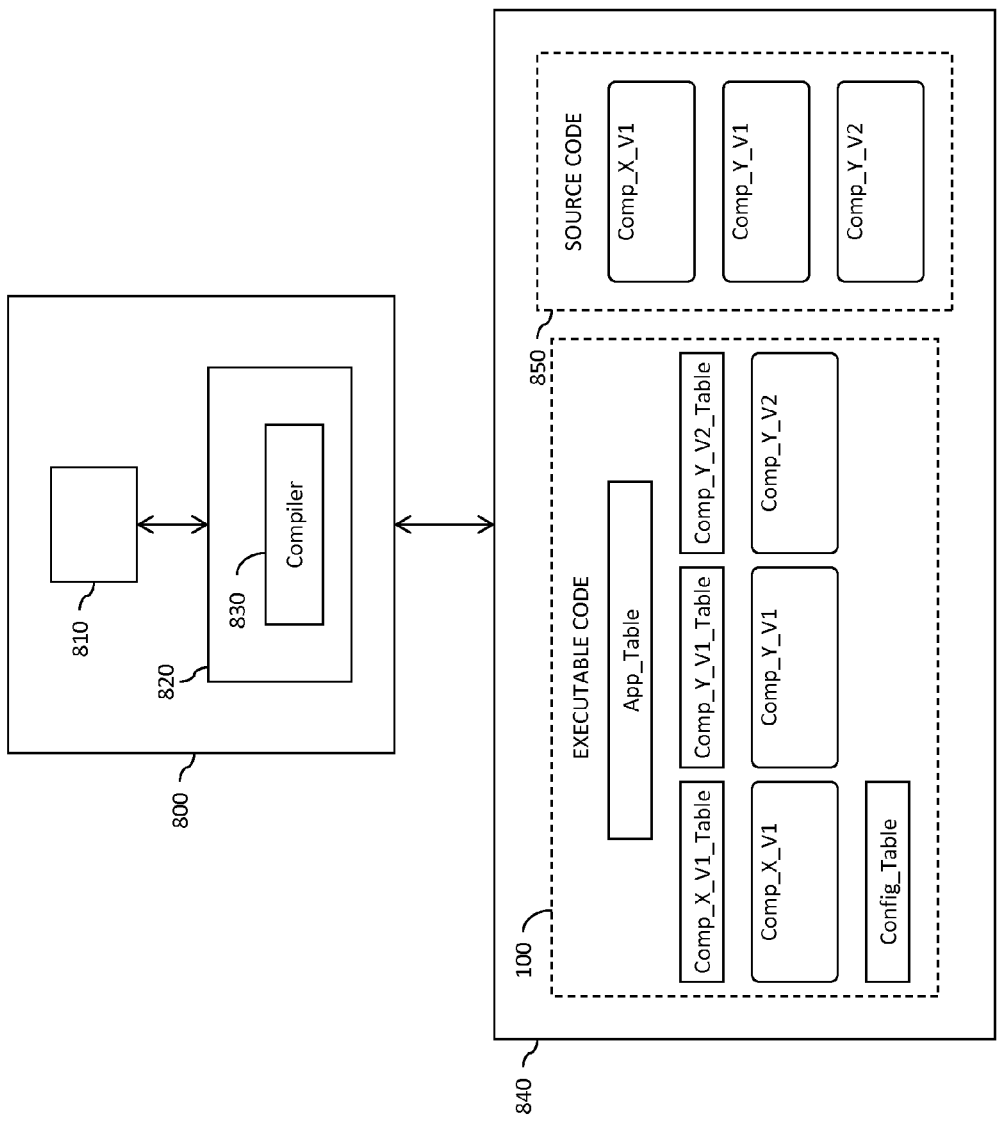
FIG. 8 illustrates a simplified block diagram of an example of an apparatus for generating executable computer program code.

Referring now to FIG. 8, there is illustrated a simplified block diagram of an example of an apparatus 800 for generating executable computer program code, such as executable computer program code for the executable computer program 100 illustrated in FIGS. 2 and 3. The apparatus 800 comprises at least one processing module 810 operably coupled to at least one memory element 820 and arranged to execute computer program code stored therein. In particular, in the illustrated example the processing module 810 is arranged to execute compiler computer program code 830 stored within the memory element 820, wherein the compiler computer program code 830 is arranged to receive source code and to generate computer program code based on the received source code. In the illustrated example, the apparatus 800 is operably coupled to one or more data storage devices 840, from where the apparatus 800 may retrieve source code 850 to be compiled and to where the apparatus may store executable program code 100 generated thereby.

In accordance with some examples, the compiler computer program code 830 may comprise executable program code for implementing inter-component function calls within a computer program, such program code may be operable for generating at least a first lower tier indirection data structure associated with at least a first software component, the at least first lower tier indirection data structure comprising at least one entry indicating a location in memory of at least one function within the at least first software component, generating at least one higher tier indirection data structure comprising an entry indicating a location in memory of the at least first lower tier indirection data structure, generating at least one configuration data structure comprising at least one entry defining an active version of the at least first software component and implementing executable computer program code for at least one inter-component function call to the at least one function within the at least first software component from within at least one further software component to load a version index reference comprising an indication of an active version of the at least first software component comprising the function to be called from an entry within the configuration data structure, reference an entry within the at least one higher tier indirection data structure to determine the location in memory of the at least first lower tier indirection data structure based on the loaded version index reference, and reference an entry in the at least first lower tier indirection data structure to determine the location in memory of the at least one function within the at least first software component.

Figure 9:
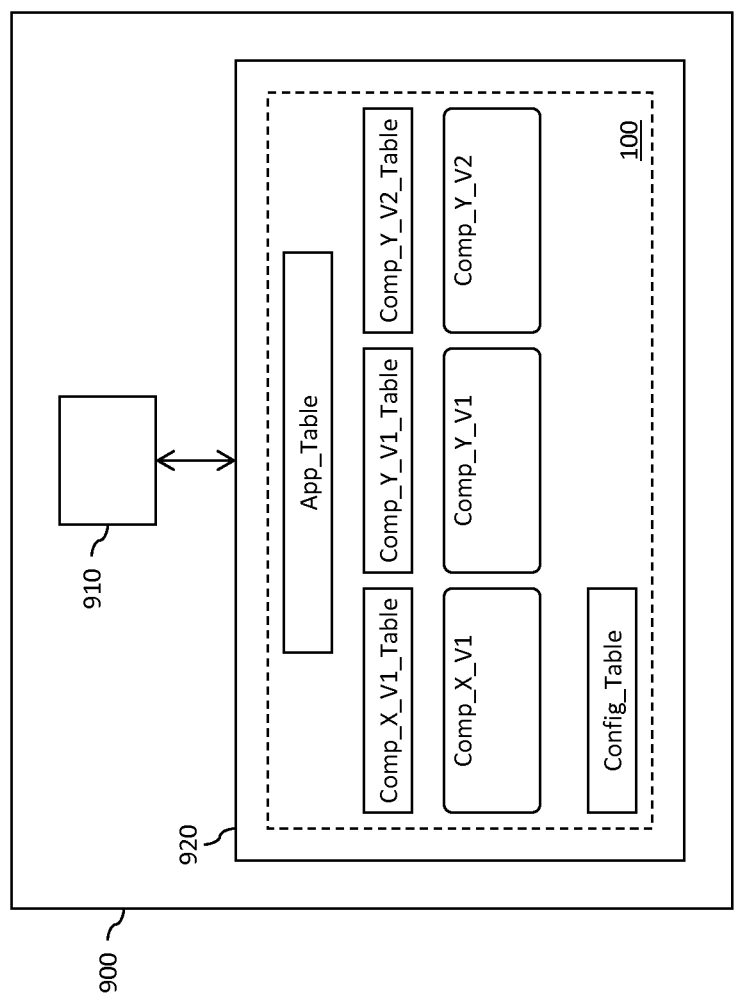
FIG. 9 illustrates a simplified block diagram of an example of a device comprising at least one processing module arranged to execute computer program code.

Referring now to FIG. 9, there is illustrated a simplified block diagram of an example of a device 900 comprising at least one processing module 910 operably coupled to at least one memory element 920 and arranged to execute computer program code stored therein, such as for the executable computer program 100 illustrated in FIGS. 2 and 3. In this manner, the processing module 910 may be arranged to execute computer program code comprising at least a first software component 120, 220 comprising at least one function, at least one lower tier indirection data structure 140, 240 associated with the at least a first software component 120, 220, the at least first lower tier indirection data structure 140, 240 comprising at least one entry 142, 242 indicating a location in memory of at least one function 122, 222 within the at least first software component 120, 220, at least one higher tier indirection data structure 150 comprising an entry 154, 156 indicating a location in memory of the at least first lower tier indirection data structure 140, 240, at least one configuration data structure 160 comprising at least one entry 164 defining an active version of the at least first software component 120, 220; at least one further software component 110 comprising at least one inter-component function call 116 to the at least one function 122, 222 within the at least first software component 120, 220, the at least one inter-component function call 116 arranged to load a version index reference 166 comprising an indication of an active version of the at least first software component 120, 220 comprising the function to be called from an entry within the configuration data structure 160, reference an entry 154, 156 within the at least one higher tier indirection data structure 150 to determine the location in memory of the at least first lower tier indirection data structure 140, 240 based on the loaded version index reference, and reference an entry in the at least first lower tier indirection data structure 140, 240 to determine the location in memory of the at least one function 122, 222 within the at least first software component 120, 220.

Advantageously, the example related to executable computer program architectures illustrated in the accompanying drawings enables a live software component update/switch to be performed for critical embedded systems which require high availability. Furthermore, the number of entries within the various indirection and configuration data structures is not restricted, providing scalability to the proposed architectures.

Examples of the invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible and non-transitory computer readable storage medium or transmitted to the computer system via a computer readable transmission medium. All or some of the computer program may be provided on computer readable media permanently, removable or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

Moreover, the terms 'higher,' 'lower,' and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of implementing inter-component function calls within a computer program, the method comprising:
generating at least a first lower tier indirection data structure associated with at least a first software component, the at least first lower tier indirection data structure comprising at least one entry indicating a location in memory of at least one function within the at least first software component;
generating at least one higher tier indirection data structure comprising a component entry indicating a location in memory of the at least first lower tier indirection data structure;
generating at least one configuration data structure comprising at least one entry defining an active version of the at least first software component, wherein the at least one entry comprises a version index reference, and wherein the version index reference comprises an index of the component entry in the at least one higher tier indirection data structure; and
implementing executable computer program code for at least one inter-component function call to the at least one function within the at least first software component from within at least one further software component to:
load the version index reference comprising an indication of an active version of the at least first software component comprising the function to be called from an entry within the configuration data structure;
reference the component entry within the at least one higher tier indirection data structure to determine the location in memory of the at least first lower tier indirection data structure based on the loaded version index reference; and
reference an entry in the at least first lower tier indirection data structure to determine the location in memory of the at least one function within the at least first software component.

2. The method of claim 1 wherein a lower tier indirection structure is generated for each software component comprising at least one function accessible outside of the respective software component.

3. The method of claim 1, wherein a lower tier indirection structure is generated for each of a first version of the at least first software component and at least one further version of the at least first software component.

4. The method of claim 3, wherein the higher tier indirection structure comprises an entry indicating a location in memory of the lower tier indirection structure for the first version of the at least first software component, and a further entry indicating a location in memory of the lower tier indirection structure for the at least one further version of the at least first software component.

5. The method of claim 1, wherein each lower tier indirection data structure comprises an entry for each function within the software function associated therewith.

6. The method of claim 1, wherein the at least one higher tier indirection data structure comprises an entry for each lower tier indirection data structure.

7. The method of claim 1, wherein each entry within each of the higher and lower tier indirection data structures comprises as least one from a group comprising:
   an address in memory; and
   an address offset value.

8. A non-transitory computer program product having executable program code stored therein for implementing inter-component function calls within a computer program, the program code operable for:
   generating at least a first lower tier indirection data structure associated with at least a first software component, the at least first lower tier indirection data structure comprising at least one entry indicating a location in memory of at least one function within the at least first software component;
   generating at least one higher tier indirection data structure comprising a component entry indicating a location in memory of the at least first lower tier indirection data structure;
   generating at least one configuration data structure comprising at least one entry defining an active version of the at least first software component, wherein the at least one entry comprises a version index reference, and wherein the version index reference comprises an index of the component entry in the at least one higher tier indirection data structure; and
   implementing executable computer program code for at least one inter-component function call to the at least one function within the at least first software component from within at least one further software component to:
      load the version index reference comprising an indication of an active version of the at least first software component comprising the function to be called from an entry within the configuration data structure;
      reference the component entry within the at least one higher tier indirection data structure to determine the location in memory of the at least first lower tier indirection data structure based on the loaded version index reference; and
      reference an entry in the at least first lower tier indirection data structure to determine the location in memory of the at least one function within the at least first software component.

9. An apparatus having one or more processors for generating executable computer program code comprising at least one processing module arranged to implement inter-component function calls within computer programs; wherein the at least one processing module is arranged to:
   generate at least a first lower tier indirection data structure associated with at least a first software component, the at least first lower tier indirection data structure comprising at least one entry indicating a location in memory of at least one function within the at least first software component;
   generate at least one higher tier indirection data structure comprising a component entry indicating a location in memory of the at least first lower tier indirection data structure;
   generate at least one configuration data structure comprising at least one entry defining an active version of the at least first software component, wherein the at least one entry comprises a version index reference, and wherein the version index reference comprises an index of the component entry in the at least one higher tier indirection data structure; and
   implement executable computer program code for at least one inter-component function call to the at least one function within the at least first software component from within at least one further software component to:
      load the version index reference comprising an indication of an active version of the software component comprising the function to be called from an entry within the configuration data structure;
      reference the component entry within the at least one higher tier indirection data structure to determine the location in memory of the at least first lower tier indirection data structure based on the loaded version index reference; and
      reference an entry in the at least first lower tier indirection data structure to determine the location in memory of the at least one function within the at least first software component.

10. A non-transitory computer program product having executable computer program code stored therein comprising:
   at least a first software component comprising at least one function;
   at least one lower tier indirection data structure associated with the at least a first software component, the at least first lower tier indirection data structure comprising at least one entry indicating a location in memory of at least one function within the at least first software component;
   at least one higher tier indirection data structure comprising a component entry indicating a location in memory of the at least first lower tier indirection data structure;
   at least one configuration data structure comprising at least one entry defining an active version of the at least first software component, wherein the at least one entry comprises a version index reference, and wherein the version index reference comprises an index of the component entry in the at least one higher tier indirection data structure;
   at least one further software component comprising at least one inter-component function call to the at least one function within the at least first software component, the at least one inter-component function call arranged to:
      load the version index reference comprising an indication of an active version of the at least first software component comprising the function to be called from an entry within the configuration data structure;
      reference the component entry within the at least one higher tier indirection data structure to determine the location in memory of the at least first lower tier indirection data structure based on the loaded version index reference; and
      reference an entry in the at least first lower tier indirection data structure to determine the location in memory of the at least one function within the at least first software component.

11. A device comprising at least one processing module arranged to execute computer program code comprising:
- at least a first software component comprising at least one function;
- at least one lower tier indirection data structure associated with the at least a first software component, the at least first lower tier indirection data structure comprising at least one entry indicating a location in memory of at least one function within the at least first software component;
- at least one higher tier indirection data structure comprising a component entry indicating a location in memory of the at least first lower tier indirection data structure;
- at least one configuration data structure comprising at least one entry defining an active version of the at least first software component, wherein the at least one entry comprises a version index reference, and wherein the version index reference comprises an index of the component entry in the at least one higher tier indirection data structure;
- at least one further software component comprising at least one inter-component function call to the at least one function within the at least first software component, the at least one inter-component function call arranged to:
  - load the version index reference comprising an indication of an active version of the at least first software component comprising the function to be called from an entry within the configuration data structure;
  - reference the component entry within the at least one higher tier indirection data structure to determine the location in memory of the at least first lower tier indirection data structure based on the loaded version index reference; and
  - reference an entry in the at least first lower tier indirection data structure to determine the location in memory of the at least one function within the at least first software component.

12. The method of claim 2, wherein a lower tier indirection structure is generated for each of a first version of the at least first software component and at least one further version of the at least first software component.

\* \* \* \* \*